United States Patent
Hornung et al.

(10) Patent No.: US 11,247,188 B2
(45) Date of Patent: Feb. 15, 2022

(54) REACTION DEVICE WITH HEAT EXCHANGER AND USE THEREOF

(71) Applicant: Fraunhofer-Gesellschaft zur Förderung der angewandten Forschung e.V., Munich (DE)

(72) Inventors: Andreas Hornung, Karlsruhe (DE); Jonathan Aigner, Amberg (DE); Peter Hense, Lippetal (DE); Alberto Pedrazzini, Castel San Giova (IT); Thorsten Hornung, Kirchheim (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/495,520

(22) PCT Filed: Mar. 5, 2018

(86) PCT No.: PCT/EP2018/055325
§ 371 (c)(1),
(2) Date: Sep. 19, 2019

(87) PCT Pub. No.: WO2018/172048
PCT Pub. Date: Sep. 27, 2018

(65) Prior Publication Data
US 2020/0009524 A1 Jan. 9, 2020

(30) Foreign Application Priority Data
Mar. 24, 2017 (DE) .......................... 102017205020.9

(51) Int. Cl.
*B01J 19/00* (2006.01)
*B01J 19/18* (2006.01)
(Continued)

(52) U.S. Cl.
CPC .......... *B01J 19/0013* (2013.01); *B01J 6/008* (2013.01); *B01J 19/0066* (2013.01);
(Continued)

(58) Field of Classification Search
CPC .... B01J 19/0013; B01J 6/008; B01J 19/0066; B01J 19/1812; B01J 19/20;
(Continued)

(56) References Cited

U.S. PATENT DOCUMENTS

| | | | |
|---|---|---|---|
| 2,335,422 | A | 11/1943 | Kiersted, Jr. |
| 2,877,106 | A | 3/1959 | Aspegren |

(Continued)

FOREIGN PATENT DOCUMENTS

| | | | |
|---|---|---|---|
| CA | 1 157 632 | A | 11/1983 |
| CN | 1218175 | A | 6/1999 |

(Continued)

OTHER PUBLICATIONS

International Search Report, issued in International Application PCT/EP2018/055325, dated Jul. 5, 2018, pp. 1-2, European Patent Office, Rijswijk, Netherlands.

*Primary Examiner* — Huy Tram Nguyen
(74) *Attorney, Agent, or Firm* — Crowell & Moring LLP

(57) ABSTRACT

A reaction device is provided with a first wall that defines an interior in which a stirring mechanism is located. A heat exchanger is at least partly provided on the first outer wall surface facing away from the interior and/or on the stirring mechanism, wherein the heat exchanger has a grate structure, and at least two layers are provided which have a grate structure. Thus, it is possible to transfer heat in a precise and efficient manner primarily by means of thermal radiation in endothermic processes at different temperature levels, in particular pyrolysis, gassing, and reforming processes, and thereby use the exhaust heat for other processes.

19 Claims, 5 Drawing Sheets

(51) Int. Cl.
*B01J 6/00* (2006.01)
*C01B 32/05* (2017.01)
*F28D 1/06* (2006.01)
*B01J 19/20* (2006.01)
*C10G 1/04* (2006.01)
*C10J 3/72* (2006.01)
*F28D 1/02* (2006.01)
*F28D 11/02* (2006.01)
*F28D 11/08* (2006.01)
*F28F 1/40* (2006.01)
*F28F 5/04* (2006.01)
*F28F 5/06* (2006.01)
*F28F 13/12* (2006.01)

(52) U.S. Cl.
CPC .......... *B01J 19/1812* (2013.01); *B01J 19/20* (2013.01); *C01B 32/05* (2017.08); *C10G 1/04* (2013.01); *C10J 3/72* (2013.01); *F28D 1/0213* (2013.01); *F28D 1/06* (2013.01); *F28D 11/02* (2013.01); *F28D 11/08* (2013.01); *F28F 1/405* (2013.01); *F28F 5/04* (2013.01); *F28F 5/06* (2013.01); *F28F 13/12* (2013.01); *B01J 2219/00076* (2013.01); *B01J 2219/00155* (2013.01); *C10G 2300/1011* (2013.01); *C10G 2300/4006* (2013.01); *C10J 2300/0916* (2013.01); *C10J 2300/1246* (2013.01); *F28F 2250/08* (2013.01)

(58) Field of Classification Search
CPC ... B01J 2219/00076; B01J 2219/00155; C01B 32/05; C10G 1/04; C10G 2300/1011; C10G 2300/4006; C10J 3/72; C10J 2300/0916; C10J 2300/1246; F28D 1/0213; F28D 1/06; F28D 11/02; F28D 11/08; F28F 1/405; F28F 5/04; F28F 5/06; F28F 13/12; F28F 2250/08; F28F 1/122; F28F 3/022; F28F 13/003
USPC .......................................................... 422/198
See application file for complete search history.

(56) References Cited

U.S. PATENT DOCUMENTS

| | | | |
|---|---|---|---|
| 3,664,795 A * | 5/1972 | Heinz et al. | B29C 48/68 |
| | | | 425/208 |
| 3,909,958 A | 10/1975 | Castanoli | |
| 4,110,193 A | 8/1978 | Gwyn et al. | |
| 4,930,484 A | 6/1990 | Binkley et al. | |
| 5,547,277 A | 8/1996 | Caspelherr et al. | |
| 6,096,407 A * | 8/2000 | Vodicka | F28F 25/087 |
| | | | 428/175 |
| 6,901,868 B2 * | 6/2005 | Hornung | C10B 7/10 |
| | | | 110/229 |
| 7,041,260 B1 * | 5/2006 | Hong | B01D 53/885 |
| | | | 422/198 |
| 9,186,648 B2 * | 11/2015 | Wolf | B01J 19/32 |
| 9,732,994 B2 | 8/2017 | Sedlak et al. | |
| 10,618,089 B2 * | 4/2020 | Curie | C10G 1/02 |
| 2009/0229798 A1 | 9/2009 | Williams et al. | |
| 2012/0180992 A1 * | 7/2012 | Koplow | F04D 29/582 |
| | | | 165/104.21 |

FOREIGN PATENT DOCUMENTS

| | | |
|---|---|---|
| CN | 205308293 U | 6/2016 |
| DE | 376791 | 6/1923 |
| DE | 508566 | 9/1930 |
| DE | 1 074 063 | 1/1960 |
| DE | 2211773 | 9/1972 |
| DE | 23 45 800 | 7/1975 |
| DE | 35 03 069 A1 | 7/1986 |
| DE | 44 12 536 A1 | 10/1995 |
| DE | 601 04 724 T2 | 8/2005 |
| DE | 601 32 995 T2 | 1/2009 |
| DE | 10 2009 007 176 A1 | 10/2010 |
| DE | 10 2009 052 045 A1 | 5/2011 |
| EP | 0 012 410 A1 | 6/1980 |
| EP | 2307824 | 4/2011 |
| GB | 371608 | 4/1932 |
| WO | WO 02/04114 A2 | 1/2002 |
| WO | 10 2010 041 956 A1 | 4/2012 |

* cited by examiner

REACTION DEVICE WITH HEAT EXCHANGER AND USE THEREOF

CROSS-REFERENCE TO RELATED APPLICATIONS

This application is a 371 nationalization of international patent application PCT/EP2018/055325 filed Mar. 5, 2018 which claims priority under 35 USC § 119 to German patent application 102017205020.9 filed Mar. 24, 2017. The entire contents of each of the above-identified applications are hereby incorporated by reference.

DETAILED DESCRIPTION

Figure 1:
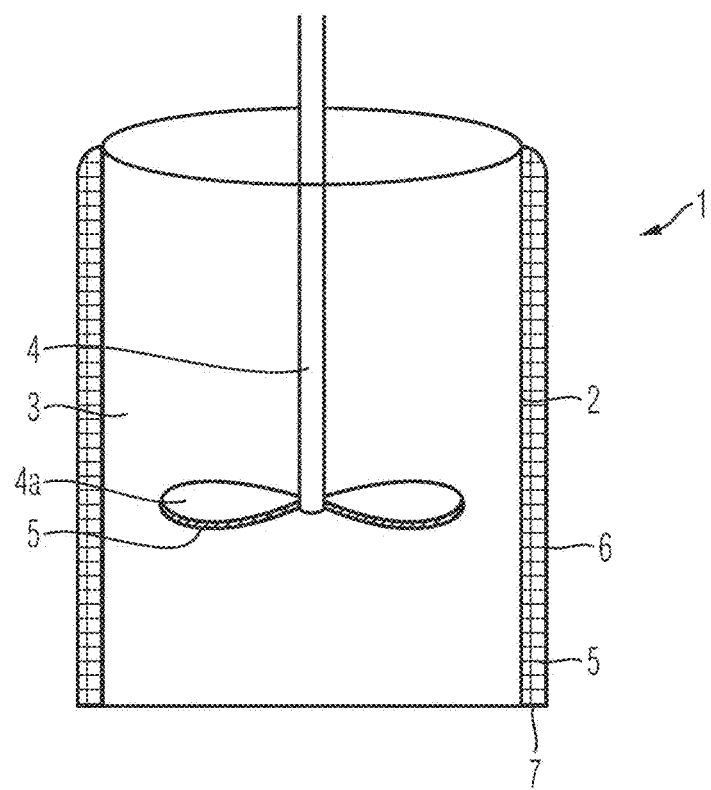
FIG. 1 shows a reaction device according to the invention.

The invention relates to a reaction device with an outer wall that defines an interior which accommodates a stirring mechanism, the reaction device further comprising a heat exchanger with a grate structure. It is thus possible to transfer heat in a precise and efficient manner primarily by means of thermal radiation in endothermic processes at different temperature levels, in particular pyrolysis, gasification and reforming, and thereby use the exhaust heat from other processes In both the thermal and thermo-chemical conversion of biomass and similar organic feedstocks, heat is transferred via heat exchangers into the material to be processed.

Examples of use are pyrolysis, gasification and reforming reactors for the decomposition and conversion of biomass or plastics. In these processes, it is technically difficult to transfer a large amount of heat into the material to be processed, in part as quickly and, at the same time, efficiently as possible. For ecological and economic reasons, it is here advantageous to use exhaust heat from the combustion of individual conversion products. This exhaust heat is potentially often sufficient to provide the required amount of heat. However, especially in the case of cylindrical reactors, it is not possible to transfer a sufficiently large amount of heat from waste gases into the material to be processed from the outside. The reasons are the relatively small heat-exchanging surface area and the generally low heat capacity of gases. Although the heat-exchanging surface area can be increased by special heat exchanger designs, such as finned bodies, these modifications are always associated with high pressure losses. For this reason, a cascade series connection of several heat exchangers is often impossible.

With regard to the heating medium, water as a heat transfer medium would be an alternative with a higher heat capacity, but the use of water at temperatures above 100° C. with the same volume is accompanied by a strong increase in pressure. This severely restricts or at least complicates a use as a heat transfer medium and thus also affects safety aspects of the entire system. Liquid heat transfer media on the basis of salt, on the other hand, have a much higher boiling point, but the melting point is also often significantly above 0° C., so that they could solidify in the heat exchanger when the system is at a standstill.

If one accepts the additional technical equipment and safety expenditure when using pressurized heat transfer media, pressurized hot gases are also suitable in addition to steam. The advantage here is significantly lower pressure losses compared to the use of liquid and vaporous heat transfer media.

In order to allow the heat input into the pyrolysis and gasification reactors, different ways or combinations thereof have been used so far:

indirect heating from the outside, in particular electrically or on the basis of burners;

indirect heating from the inside, in particular through the screw shaft or hollow screw surfaces; e.g. hollow screw heat exchangers (inter alia DE 4412536, U.S. Pat. Nos. 2,335,422, 3,909,958, 4,930,484, DE3503069);

direct contact of the heating medium with the material to be converted through inflow of a heated (inert) gas (e.g. DE 60104724); and direct contact of the heating medium with the material to be converted through heated heat exchange particles, such as balls, which are added to the material to be processed (inter alia DE2345800, DE376791, DE508566, DE60104724, DE102009007176, U.S. Pat. Nos. 2,877,106, 4,110,193).

These and other concepts are partially modified or slightly adapted for the efficient heat transfer by means of thermal radiation. Examples are inter alia black anodized finned bodies or paintwork with paint that emits large amounts of radiation in the infrared range.

Patent specification GB19310012139 from 1931 describes a heat exchanger that uses a reticular structure. The fabric mentioned in this document is a two-dimensional fabric which is transformed into a three-dimensional body by bending and folding.

Proceeding from the prior art, the object of the invention is therefore to provide a reaction device with a heat exchanger with improved properties.

The invention proposes a reaction device with a first wall which defines an interior that accommodates a stirring mechanism, a heat exchanger being at least partly provided on the surface of the first wall that faces away from the interior and/or on the stirring mechanism, wherein the heat exchanger has a grate structure and at least two layers are provided which have a grate structure.

A reaction device in the sense of the present invention is understood to mean any device in which a reaction can be carried out. Examples of such reaction devices are reactors, in particular in the form of a cylinder, for example tube furnaces. The term reaction device may refer to a reactor, a section thereof and several, e.g. two to four, reactors connected to one another.

In the reaction device according to the invention, the stirring mechanism at least partly includes the heat exchanger. For this purpose, the stirring mechanism can have hollow stirring blades, in the cavities of which the heat exchanger is provided.

In one embodiment, the reaction device has a double wall made of the first wall and a second wall so that an intermediate space which accommodates the heat exchanger is formed between the first wall and the second wall. Thus, the heat exchanger can be mounted in a particularly favorable way to achieve the improved properties.

In one embodiment, the reaction device according to the invention is a tube furnace. In another embodiment, the stirring mechanism is a screw conveyor. With this design, the improved properties to be achieved according to the invention can be achieved in a particularly favorable way.

In one embodiment, the screw conveyor has sections with different gradients. In this way, sections are defined in which the components can be mixed differently, can be controlled individually in a specific way and can have different temperatures.

In a further embodiment, the reaction device according to the invention has several reaction zones with different temperatures, so that the reaction processes can be controlled in a specific way depending on the requirements.

In a further embodiment, the several sections are either present in one reactor or in interconnected reactors with different temperatures. As a favorable result, the reaction processes can be advantageously and specifically controlled.

In particular, the heat exchanger is favorable for round or semicircular reactors, for example for the thermo-chemical conversion of biomass, coal, plastics, polymer-containing (metal) mixtures or mixtures thereof. Furthermore, a use on extruders for processing polymers, plastics and the like is possible.

As application-related designs, the heat exchanger can favorably be used to specifically supply or dissipate heat energy in reaction devices having several reaction zones. An example is here the cascade design in biomass conversion, in which the middle reactor section has the highest heat requirement for reasons of reaction kinetics. This requirement can be met with the help of the present invention through the installation of different temperature zones and specific control and distribution of the hot gas flow in the heat exchanger.

According to the invention, a heat exchanger is provided to transfer thermal energy from one material flow to another material flow in the reaction device, the heat exchanger having a structure of a grate (hereinafter also referred to as grate structure) and the heat exchanger comprising or consisting of at least two layers or plies having the structure of a grate.

A grate structure in the sense of the present invention is understood to mean any grate structure, wherein a grate is an arrangement of elongate parts at in particular equal distances. The elongate parts can here be crossed by other elongate parts, thus forming a structure having, in particular, regular meshes or openings. The meshes/openings can have any geometrical shape, for example they can be rhombic, square or hexagonal. The grate can also have a circumferential bordering. The grate structure can be rigid or flexible.

This grate structure is used as a heat exchanger. This means, in particular, that the grate structure is adapted in such a way that it meets the requirements to be usable as a heat exchanger. The heat exchanger according to the invention is in particular adapted in such a way that medium flows through all layers.

The heat exchanger has at least two layers with grate structures, for example between about 3 and about 50 or between about 5 and about 30. This multi-layer structure can be produced, for example, by stacking the layers with grate structures on top of one another.

The heat exchanger known from the above GB 9310012139 differs from the heat exchanger used according to the invention in the following points: The network described in GB19310012139, despite bending and folding, consists, on the one hand, only of one layer through which the medium flows and, on the other hand, medium only flows through this layer in the radial direction, similar to the passage of a screen. In order to have as large a heat-transferring surface area as possible, the network should have a very fine network structure, but this would lead to high pressure losses. A similar effect occurs when several layers of the network from GB19310012139 are stratified. In contrast, the heat exchanger used according to the invention has several layers, each of which has a grate structure, and is also adapted in such a way that medium flows through all layers.

By means of the heat exchanger, it is possible to transfer heat accurately and efficiently, above all by means of thermal radiation, into endothermic processes at different temperature levels, in particular pyrolysis, gasification and reforming and, in so doing, using exhaust heat from other processes. The utilization of the highly efficient energy transfer by means of thermal radiation can be achieved by the heat exchanger even at comparatively low temperatures of 500° C. The heat source is in particular hot gas which comes from the combustion of conversion products, e.g. pyrolysis or gasification. The rapid input of heat required in many processes is largely determined by the available heat-exchanging surface area, which is significantly enlarged by the special grate structure compared to the surface of the reactor device wall. The pressure losses occurring in comparable systems, such as finned bodies, are reduced to a minimum.

The reason for the very low pressure losses is that a laminar flow with accompanying low volume flow or low flow velocities is sufficient to be able to operate the heat exchanger efficiently. Therefore, the generation of turbulent flows, which in turn would require significantly larger units, can be dispensed with. This saves both investment costs and energy costs.

In one embodiment, the layers of the heat exchanger are connected to one another at their contact points or surfaces, the term "connected" indicating that a permanent bond may be present, such as can be achieved by welding, soldering or gluing. This is advantageous with regard to heat transfer in the lower temperature range.

In one embodiment, the grate structure comprises or consists of a mesh screen, i.e. a grate with meshes that can be individually designed depending on the use. In the heat exchanger, each layer thereof can have or consist of such a mesh screen. In this way, the advantages according to the invention are achieved in a particularly favorable way. With regard to the grate structure, in particular stacked, drawn grate surfaces with wires can be concerned. In general, it is possible to carry out the grate structure deign in any three-dimensional structures. A honeycomb structure can be named as an example of an ordered or symmetrical structure. However, the grate can also be used as a non-ordered, asymmetrical structure. For use as a heat exchanger for hot gases, very low pressure losses and high proportions of thermal radiation are favorable compared to other types of heat transfer. Depending on the choice of material, the effects of thermal radiation can already take effect at comparatively low temperatures (400 to 500° C.).

In one embodiment, the mesh screen can have at least one of the following parameters, in some embodiments also all of these parameters: a mesh size from about 3 mm to about 30 mm or from about 8 mm to about 25 mm; a gap volume fraction of about 80% to about 97% or of about 90% to about 95%, or a surface density for convective heat transfer from the gas to the grate of about 500 $m^2/m^3$ or less. Due to a high channel width of about 30 mm to about 150 mm or about 50 mm to about 100 mm, the gap volume fraction and the surface density, an exceptionally low hot gas flow rate of at most about 1.5 m/s is sufficient for the efficient heat transfer. The generation of a turbulent gas flow with accompanying pressure loss is not necessary.

There are various options for the geometric design of the grate structure. The design can, for example, take the form of several layers of a relatively flat, approximately two-dimensional grate structure connected with one another by wires. The grate structure can also consist of wires curved in an undulated way, which are connected to one another at suitable points over several planes. The grate structure can additionally be provided with longitudinal fins, which increases the heat transfer surface area and can improve the heat conduction along the reactor wall. In addition, fins or plates can be used to direct gas flow within the heat transfer system in a targeted way. As a further possibility, the grate structure can have interconnected wire bodies, which can have a more or less complex geometry. The design of these wire bodies can, for example, be similar to the geometry of Raschig rings and their variations. The grate can also be similar to a honeycomb structure. It can also be designed as a disordered grate structure, similar to steel wool. The wire thickness can here be selected depending on the process parameters (especially temperature and oxygen content) in order to guarantee the stability of the lattice structure.

In one embodiment, the heat exchanger, i.e. the grate structure, can comprise or consist of a metal, a metal alloy, a sintered metal compound or a ceramic material. For example, metals such as copper, iron, aluminum and various metal alloys (e.g. VA-steel) are suitable for the heat transfer in the low-temperature range. Another possibility is the use of sintered metal compounds (e.g. sintered copper layer on a steel base) or materials and metals coated in another way. The combination of different materials can be made for reasons of corrosion protection and/or to improve the properties of heat conduction and/or thermal radiation. For the high temperature range, inter alia ceramic materials (e.g. aluminum oxide or silicon carbide) can be used.

In one embodiment, the heat exchanger can have a catalyst. By special coatings of the grate structure, e.g. metallic or ceramic coating, a catalytic effect can be achieved in addition to the function as a heat exchanger. This effect promotes desired reactions in the heat exchanger medium used. One example is the reduction of harmful flue gas components (e.g. NOx, dioxins/furans, etc.) in the use of the exhaust heat of flue gases.

In one embodiment, the heat exchanger can be designed as a reflector (e.g. polished wire); in particular, the wall of the reaction device is designed as a black body (e.g. calorized steel). This allows an even distribution of the radiant heat to be achieved.

In one embodiment, the heat exchanger can have fins, in particular longitudinal fins. Particularly at relatively low flue gas temperatures, the installation of fins/longitudinal fins, which can be firmly connected to the reactor wall, in the grate structure is favorable. This additionally increases the heat transfer surface area. In addition, improved heat conduction into the reactor wall takes place. The heat exchanger according to the invention can be provided for heating fixed-bed reactors. In order to further increase the heat transfer surface area, fins which extend into the bulk bed can be installed inside the reactor. In this way, the increased amount of heat, which is provided from the outside through the grate, can be efficiently introduced into the reaction bed.

In one embodiment, the heat exchanger can be available together with an insulation material. This can be useful, for example, to prevent overheating of the reaction device at the point of hot gas introduction or to protect bearings and seals at the start and end pieces of the reaction device from overheating. A change in the material thickness of the insulating layer can also be used as an insulation or puffer and to homogenize the temperature distribution. In this way, a temperature that tends to be too hot in the outdoor area (i.e. in this case in the heat exchanger) can be introduced into the specific reaction area uniformly and at a level suitable for the reaction. The heat exchanger can be combined with insulation material in a sandwich design, which can also be designed as a wedge. This is particularly favorable for heat exchangers with longitudinal flow as well as for cross-flow heat exchangers.

In one embodiment, the reaction device according to the invention can be used for carbonizing, cracking and/or reforming biomass and/or bioresidues. For this purpose, at least two reaction devices can be used, which can be operated at different temperatures, wherein the at least two reaction devices can be arranged in cascade-like fashion. In particular, biomass or bioresidues can be carbonized, cracked and reformed in two reactor stages in the absence of oxygen. The solid conversion products resulting from these processes can be gasified and then burned in a gas burner, thereby producing hot gas.

In order to make efficient and in-process use of the hot gases, the heat exchanger is used to transfer energy to the reaction device on the basis of the special, stacked/layered and thus three-dimensional grate structure of the heat exchanger through which the hot gas flows. Due to the special structure of this grate, the amount of thermal energy in the hot gas can be efficiently introduced into the reaction device by increasing the heat transfer area without high pressure losses in the system. The cascade-like series connection of the reaction devices having different temperatures makes it possible to use the residual energy amount available after each step. In this way, the share of secondary energy sources in the total energy or heat supply is significantly reduced and the overall system can be operated independently with regard to the thermal energy balance once the operating temperatures have been reached.

In one embodiment, the reaction device according to the invention can be used to dissipate heat from exothermic processes and for heat recovery. For example, the heat exchanger can be used to indirectly cool reaction devices from the outside. Due to the very low pressure losses, it is also possible to cool hot gas streams effectively and to allow heat recovery by introducing the heat exchanger directly into the exhaust gas stream.

Compared to heating by means of electrical or burner-based systems, there is a clear improvement in terms of highly efficient heat transfer into the material to be converted, which is characterized by a high proportion of thermal radiation. The very use of hot gases from the combustion of conversion products is limited in conventional heat exchangers due to the limited heat transfer surface area(s) and inter alia inefficient as a result of high pressure losses.

In one embodiment, the device according to the invention can be used for the dynamic control of temperature-controlled (batch) reactor systems in which the reaction kinetics make it necessary to first supply heat to the process taking place in the reaction device and, after exceeding a predetermined threshold, to dissipate heat again. Examples of such processes can be both chemical and enzymatic reactions. Due to the dynamic starting, stopping and changing possibilities, applications in emergency shutdown procedures are also possible.

In addition to efficient heating, the heat exchanger is also suitable for cooling reactors. Examples are exothermic conversion processes (e.g. gasification and combustion) where there is a risk of overheating. The heat exchanger allows a specified removal of excess heat, above all if this heat occurs locally in certain reaction zones. This heat can be achieved by the specified control of the cooling medium via baffles or separate heat exchanger cascades separated from one another.

In addition, the heat exchanger can be combined with various heating systems, such as resistance heating or induction heating. With regard to the examples mentioned, the grate can also be used as an electrical conductor if a suitable material is selected, in order to function not only as a heat exchanger but also as an active heating element. In addition to those already mentioned, all fluids, including air or clean gases, such as nitrogen or argon, are generally suitable as heat transfer media. Media, such as thermal oils, which are liquid at higher temperatures, are also conceivable.

The heat exchanger offers several advantages over other heat exchanger systems. One advantage is the increase in the heat transfer surface area, which means that considerably lower flow velocities or volume flows are required. As a result, pressure losses are lower than in heat exchangers, which only achieve sufficient heat transfer performance in turbulent flow conditions (e.g. plate or tube bundle heat exchangers). The use of the grate structure is therefore also different from other solutions which are used to increase the heat transfer surface, for example the use of a ball bed or steel wool. Both solutions lead to high pressure losses in contrast to the heat exchanger with grate structure. Another advantage is that the heat exchanger according to the invention is largely tolerant to incrustation due to its low pressure drop, which reduces the risk of failure and maintenance costs compared to heat exchangers according to the prior art. This makes the heat exchanger particularly suitable for dust-containing and/or salt-containing flue gases.

Due to the low pressure losses of the heat exchanger with grate structure, it is possible to arrange several reactors in cascade-like fashion if these reactors require heat at different temperature levels. The heat energy present in the hot gas is introduced in stages into the conversion processes. The residual heat remaining after the last stage can be used to heat the combustion air for the gas burner and/or to dry possible moist feedstocks of the overall process.

Different types of heat exchangers can be combined to create a very product-specific heat input design. For example, the first reactor could be operated in counter-current, the second in cross-current and the reactors three and four in co-current. This is particularly favorable if the input material is heated slowly, is then uniformly supplied with heat at a constant temperature and shall subsequently be quickly raised to higher temperatures.

The invention will be explained in more detail below by means of drawings and exemplary embodiments without limiting the general concept of the invention.

FIG. 1 shows a reaction device 1 according to the invention. This device has a first wall 2 that defines an interior 3, which accommodates a stirring mechanism 4. Furthermore, the reaction device according to the invention has a second wall 6 defining an intermediate space 7 between the first wall 2 and the second wall 6. In this intermediate space 7 there is the heat exchanger 5. The stirring mechanism 4 has hollow screw blades 4a which accommodate the heat exchanger 5 in the same way as between the first wall 2 and the second wall 6 in the intermediate space 7.

Figure 2:
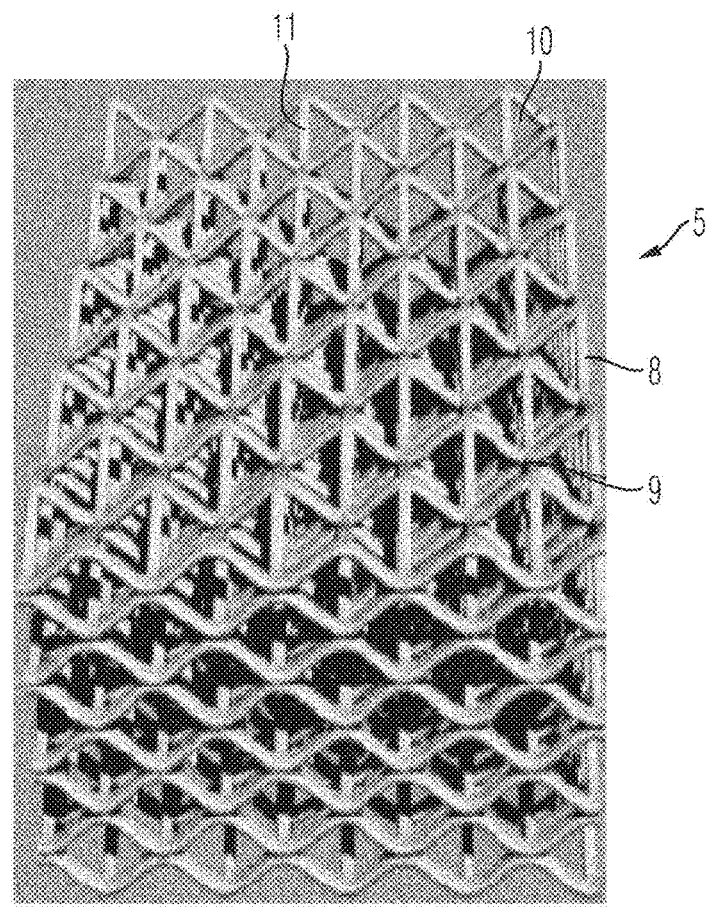
FIG. 2 shows a heat exchanger.

FIG. 2 shows a heat exchanger 5. The grate structure concerns stacked, drawn grates with wires 8, which touch the wires 8 of the next grate at the points of contact 9 and are welded directly thereto, which is particularly useful for the heat transfer in the lower temperature range. The grate structure has meshes 10 and therefore it is a mesh screen. Furthermore, the grate structure has ribs 11.

The mesh screen includes the following parameters: a mesh size of about 8 mm, a gap volume fraction of about 90%, or a surface density for convective heat transfer from gas to grate of up to about 500 m$^2$/m$^3$. Due to a high channel width (about 100 mm), gap volume fraction and surface density, an exceptionally low hot gas flow velocity of a maximum of 1.5 m/s is sufficient for an efficient heat transfer. The generation of a turbulent gas flow with accompanying pressure loss is not necessary.

The following application and calculation example shows the advantages of the heat exchanger 5 of FIG. 2 when used in a reaction device 1. In a thermal method, biomass, such as sewage sludge, substrate from biogas systems or horse manure, is carbonized, cracked and reformed in two reactor stages in the absence of oxygen. In general, three fractions are formed, which are divided into solid (coal), liquid (oil) and gaseous products according to their aggregate state. For the liquid and gaseous products, for example, there is the economically and ecologically very interesting option of using them in a dual-fuel block-type thermal power station (BHKW) in order to produce e.g. in a demand-specific way electricity and heat. The resulting carbon-rich coal, on the other hand, is gasified and then burnt in a gas burner to provide the heat required for the process. The combustion gases with an initial temperature of about 1200° C. are used to heat the reactor over a total of 4 zones with different temperature levels, so that the combustion gases are sequentially passed through four reaction zones (cf. FIG. 3).

Figure 3:
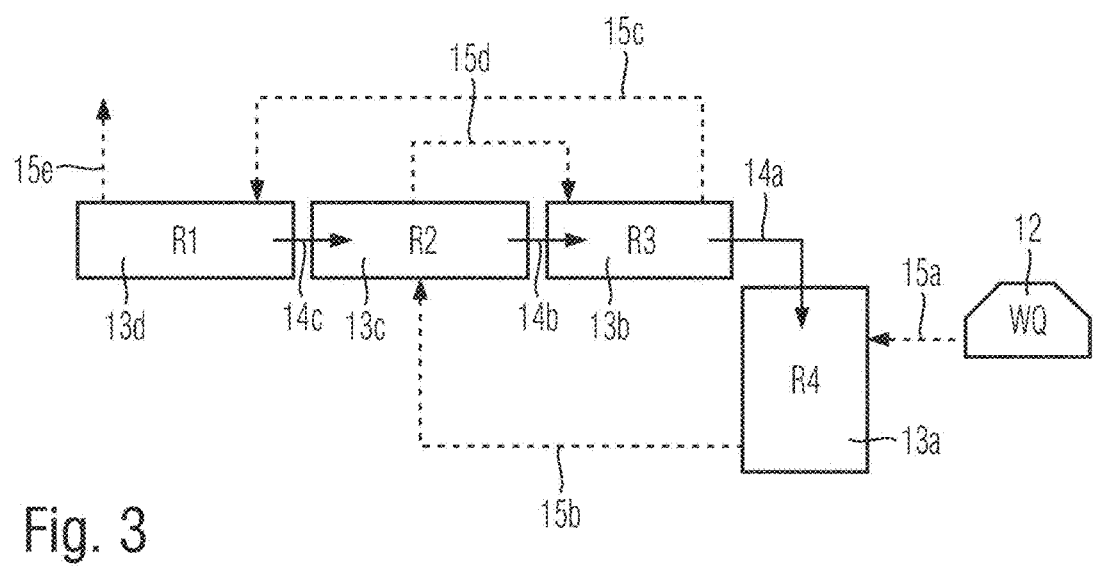
FIG. 3 shows a reactor arrangement in which the heat exchanger is used.

FIG. 3 shows a reactor arrangement in which the heat exchanger is used. The arrangement has four reaction zones 13a, 13b, 13c and 13d, which can be individual, separate reactors detached from one another or also different sections of a reactor. For the sake of simplicity, the term reaction zone is used below for these two cases. The reaction zone 13a is connected to a heat source 12, so that hot gas is passed into the reaction zone 13a via the pipe 15a. From reaction zone 13a, hot gas is passed via pipe 15b to the reaction zone 13c, and from reaction zone 13c via the pipe 15b to the reaction zone 13b. From the reaction zone 13b, the hot gas passes through pipe 15c to reaction zone 13d from where the hot gas is discharged through the pipe 15e. Proceeding from reaction zone 13d, the material to be converted is passed through pipes 14c, 14b and 14a via reaction zones 13c and 13b into the reaction zone 13a. Here, the reaction zone 13a has the highest temperature. The hot gas pipes 15a, 15b, 15c and 15d are equipped with the above described heat exchanger 5 with grate structure.

The reactor system on which this example is based is of commercial scale and has a capacity of 300 kg/h. The system has the basic data given in table 1:

TABLE 1

Geometric data of the reactor system

| | Reaction zone 13d | Reaction zone 13c | Reaction zone 13b | Reaction zone 13a |
|---|---|---|---|---|
| Inner diameter [mm] | 800 | 800 | 800 | 1400 |
| Length ]mm] | 2400 | 2400 | 2100 | 800 |
| Wall thickness [mm] | 12 | 12 | 12% | 100 |
| Width of the gas channels [mm] | 100 | 100 | 100 | 100 |

Regarding the geometries listed in table 1, it should be noted that widths from 10 to 200 mm are considered typical.

Small reactors on a pilot plant or even laboratory scale, however, can also be operated with widths of less than 10 mm.

Using such a system, as described in table 1, heat flows of more than 20 kW/m$^2$ can be achieved with low pressure losses, depending on the heat flow in the reactor interior, the hot gas temperatures and wall temperatures.

In the concrete example, considering 4 reaction zones 13a, 13b, 13c and 13d a total of 156.9 kW heat flow via a total wall area of 15.6 m$^2$ are realized at hot gas temperatures of 1200° C. (inlet) to 523° C. (outlet). At the same time, a calculated pressure loss of only 129.2 hPa is generated.

With optimum preheating of the combustion air using the exhaust heat, a thermal efficiency of the heat transfer mechanism of up to 86.9% can be achieved by neglecting heat losses in the pipes (14a-e) and by radiating the reactor surfaces.

Table 2 shows the results of the exemplary embodiment with regard to heat energy data.

TABLE 2

| | Reaction zone 13d | Reaction zone 13c | Reaction zone 13b | Reaction zone 13a |
|---|---|---|---|---|
| Heat flow [kW/m$^2$] | 13.8 | 16.3 | 11.1 | 5.3 |
| Temperature IN [° C.] | 710 | 1049 | 838 | 1200 |
| Temperature OUT [° C.] | 523 | 838 | 710 | 1049 |

For the provision of the amount of thermal energy underlying the example in 690 kg/h hot gas at 1200° C., 48.3 kg of the (bio)coal produced are required per hour, which char has a calorific value of 16.6 MJ/kg and an ash content of 38 Ma. %. In various experiments with the most different input materials, it was shown that this quantity can be provided within the process (on average, 120 kg/h biochar is produced from 400 kg/h input).

In order to produce the hot gas, the coal is first gasified in a countercurrent gasifier and then burnt in a pressure chamber under slight overpressure. A cold gas efficiency in the range of 80-90% can be achieved here, so that the overall thermal efficiency of such a heating system is about 70-80%.

For the pneumatically efficient overcoming of the pressure loss of the heating system, a combination of pressure and suction fan can be used, which makes an exhaust gas heat exchanger favorable for reasons of material selection.

As a general rule, the overall efficiency of such a heating system increases with the inlet temperature of the combustion gas.

Figure 4:
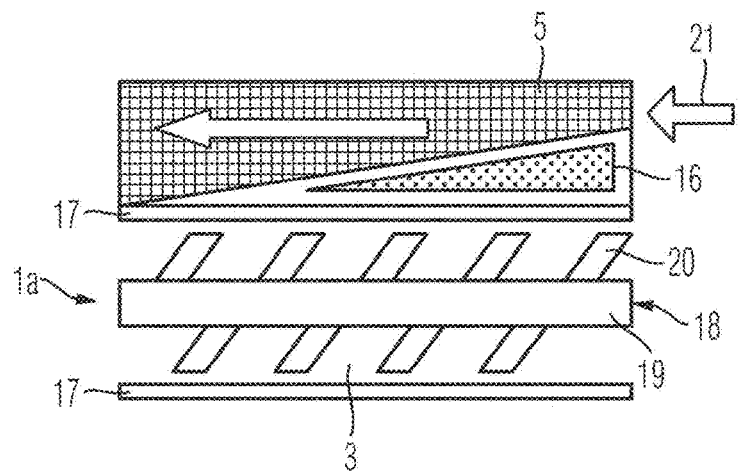
FIG. 4 shows the combination of a heat exchanger with insulation material in a tube furnace with a screw conveyor as a reaction device according to the invention in a first embodiment.
Figure 5:
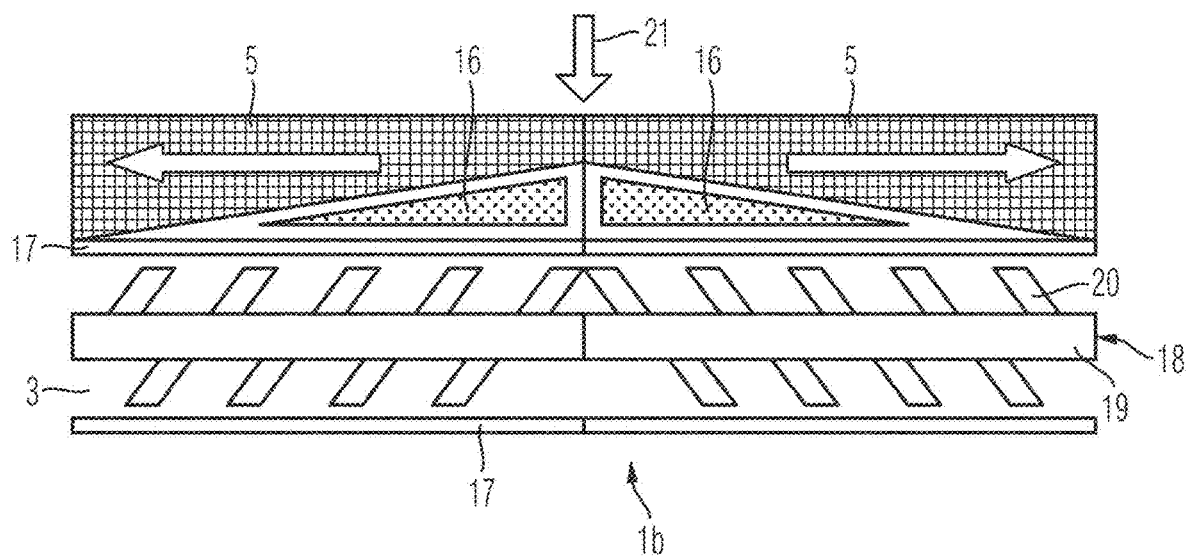
FIG. 5 shows the combination of a heat exchanger with insulation material in a tube furnace with a screw conveyor as a reaction device according to the invention in a second embodiment.

FIGS. 4 and 5 show how the heat exchanger 5 is combined with insulation material 16. This can be favorable, for example, to avoid overheating of the reactor at the point of hot gas introduction or to protect bearings and seals at the start or end pieces of the reactor from overheating. The combination of heat exchanger 5 and insulation material 16 is a sandwich design with a wedge shape. This is particularly useful for heat exchangers with longitudinal flow and cross-flow heat exchangers, as shown in FIGS. 4 and 5 below.

FIG. 4 shows one of the possible reaction zones 13a, 13b, 13c and 13d from FIG. 3. The reaction device 1 described therein is exemplarily shown as a tube furnace 1a, where the tube wall 17 defines the interior 3, which accommodates a screw conveyor 18 that has a screw shaft 19 and screw blades 20. The heat exchanger 5 and the insulation material 16 are provided on the surface facing away from the interior. Both are approximately wedge-shaped and stacked on top of each other. The hot gas flow 21 runs longitudinally along the pipe wall 17 and flows through the wedge-shaped heat exchanger 5 and the likewise wedge-shaped insulation material 16.

FIG. 5 shows the combination of heat exchanger 5 and insulation material 16 in a cross heat exchanger 1b. The cross heat exchanger 1b comprises a pipe wall 17, which defines the interior 3, which accommodates the screw conveyor 18 that has a screw shaft 19 and screw blades 20. The cross-flow heat exchanger 1b has two sections which are characterized by the opposing slopes of the screw blades shown in FIG. 5. In both sections, the heat exchanger 5 and the insulation material 16 are located on the surface of the pipe wall 17 opposite the interior 3 and are both stacked on top of each other and wedge-shaped. FIG. 5 shows the hot gas flow 21 marked with arrows. The hot gas flow 21 divides and flows into both sections.

Reactors with internal stirring units, such as screws 18, and large reactor diameters, provide heating from the outside and in addition heating through the screw shaft 19 (variant 1) and/or the screw blades 20 (variant 2) is also possible. In the case of variant 2 there are again two variants (2a and 2b):

Variant 1): The screw shaft 19 is (additionally) used for heating purposes: The screw shaft 19 is hollow and filled with the heat exchanger 5 with grate structure. The hot gas then flows through the screw shaft at the appropriate temperature and thermal energy is conducted from the inside of the reactor into the material to be converted.

Variant 2): The screw blades 20 are also filled with the heat exchanger 5 with grate structure and hot gas flows through them as an alternative to or in addition to the screw shaft 19:

2a): Hot gas flows through the screw blades 20 filled with the heat exchanger 5 with grate structure from beginning to end. This design is particularly interesting if an internal temperature gradient can be used, e.g. a DC heat exchanger, to bring the medium to be converted to the same temperature as the hot gas.

2b): The screw shaft 19 guides hot gases of different or equal temperatures in individual pipes 22 to different sections 25A, 25B, 25C of the screw. The pipe ends then direct the hot gases into segments of the screw blades 20, which can precisely introduce the heat energy into the material to be converted. This variant can be used to temper material step by step or along a cascade-like arrangement of reactors. In the latter case, the individual reactors cannot be installed separately in one system. This saves space and can reduce heat losses.

Figure 6:
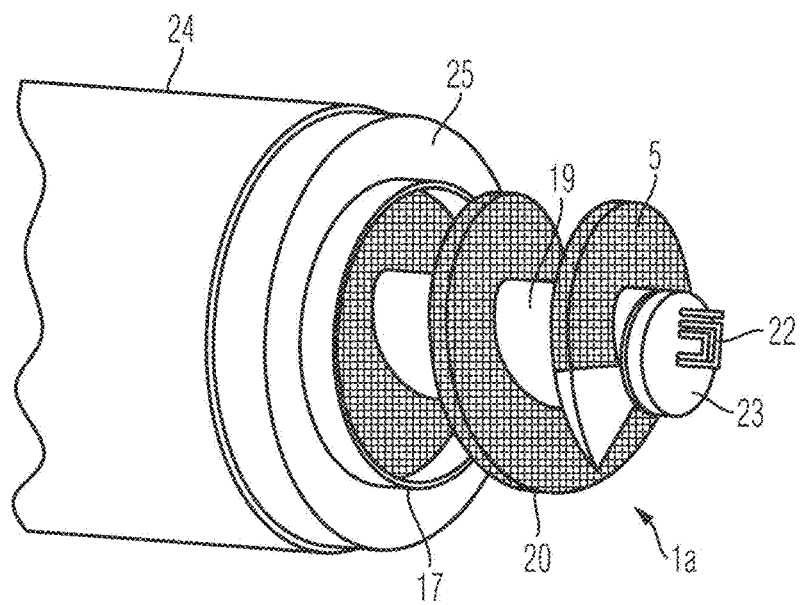
FIG. 6 shows a three-dimensional view of a screw blade of a tube furnace with screw conveyor that is filled with the heat exchanger as well as the pipelines for heating the individual screw sections.
Figure 7:
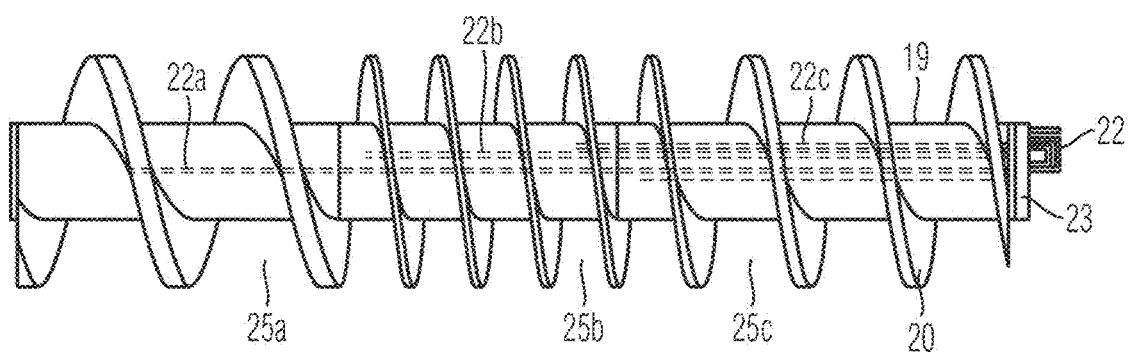
FIG. 7 shows a side view of the tube furnace from FIG. 6 with three individually thermally and mechanically controllable screw sections.

The following FIGS. 6 to 8 illustrate the variant 2b in particular described above.

FIG. 6 shows a tube furnace 1a in three-dimensional view, in which the screw blades 20 are filled with the heat exchanger 5. Furthermore, the heat exchanger 5 is located in a space formed by the pipe wall 17 and an outer wall 24. A cover 23 with piping 22 closes the screw shaft 19, the piping 22 extending into the screw shaft 19 to transport hot gas therein.

FIG. 7 shows a side view of the device from FIG. 6 with three screw sections 25a, 25b and 25c which can be controlled thermally and mechanically individually via the lines 22a, 22b and 22c. The line 22a here extends to the end of the screw section 25a and the line 22b to the end of the screw section 25b. The third line 22c extends to the end of the third screw section 25c. The above-mentioned individual thermal and mechanical controllability of the screw sections 25a, 25b and 25c can thus be achieved by lines 22a, 22b and 22c having different lengths. As can be seen from FIG. 7, the screw blades 20 can have a different pitch in the different screw sections 25a and 25b and 25c. The inside of the screw shaft 19 can be closed by a cover 23. Hot gas can be transported in the lines 22a, 22b and 22c.

Figure 8A:
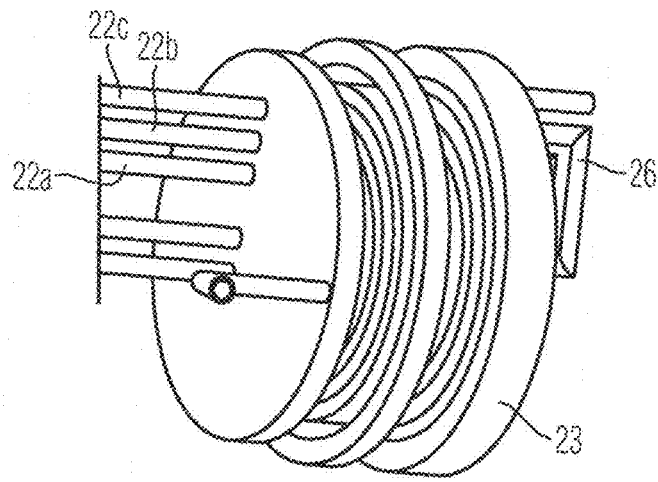
FIG. 8a shows a three-dimensional view of the transition to heating the individual screw sections of the tube furnace in FIG. 6.
Figure 8B:
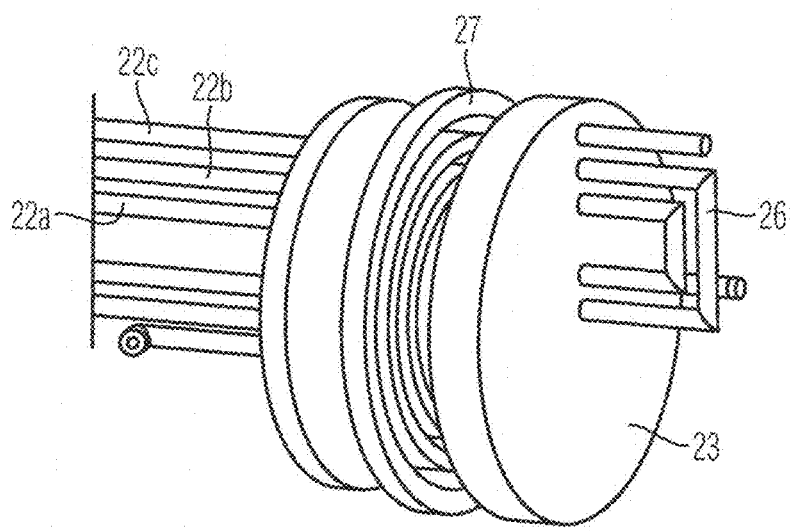
FIG. 8b shows an alternate three-dimensional view of the transition to heating the individual screw sections of the tube furnace in FIG. 6.

FIGS. 8a and 8b show a three-dimensional view of the transition piece for heating the individual screw sections 25a, 25b and 25c from two different perspectives, as described in detail in FIG. 7. The lines 22a, 22b and 22c can be connected to one another via connecting lines 26 in such a way that the return flow from one section becomes the forward flow of the other section.

In addition to the above-mentioned designs for introducing heat by means of the heat exchanger type described in this invention, it is also possible to reverse the process in the case of exothermic processes. Heat is thus released in one or more reactors and can be dissipated via the novel heat exchangers and made available to subsequent processes.

Since the hot gas flows in each exemplary embodiment in a separate (gas-) tightly sealed passageway to the material to be processed, it is generally also possible to use hot gases, which, e.g. due to their composition, should not come into contact with the material to be processed.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A reaction device comprising:
a first wall, which defines an interior, the interior configured to accommodate a stirring mechanism,
wherein a heat exchanger is at least partly on a surface of the first wall that faces away from the interior and/or on the stirring mechanism, the heat exchanger including at least two layers each of which has a grate structure, and
wherein the heat exchanger is present together with an insulation material.

2. The reaction device according to claim 1, wherein the reaction device has a double wall comprising:
the first wall, and
a second wall, so that an intermediate space, which accommodates the heat exchanger, is formed between the first wall and the second wall.

3. The reaction device according to claim 2, wherein the reaction device is a tube furnace.

4. The reaction device according to claim 1, wherein the stirring mechanism is a screw conveyor.

5. The reaction device according to claim 4, wherein the screw conveyor comprises screw sections, which have different pitches.

6. The reaction device according to claim 1, wherein the reaction device has at least two reaction zones with different temperatures.

7. The reaction device according to claim 1, wherein the layers of the heat exchanger are connected to one another at contact points of the layers or contact surfaces of the layers.

8. The reaction device according claim 1, wherein the structure of a grate comprises a mesh screen.

9. The reaction device according to claim 8, wherein the mesh screen has a mesh size of 3 mm to 30 mm.

10. The reaction device according to claim 8, wherein a gap volume fraction of the mesh screen is 90% to 95%.

11. The reaction device according to claim 8, wherein a surface density of the mesh screen for convective heat transfer from gas to grate is between 200 m2/m3 and 500 m2/m3.

12. The reaction device according to claim 8, wherein a channel width of the mesh screen is between 30 mm and 150 mm.

13. The reaction device according to claim 1, wherein the heat exchanger comprises
a metal,
a metal alloy,
a sintered metal compound, or
a ceramic material.

14. The reaction device according to claim 1, wherein the heat exchanger includes a catalyst.

15. The reaction device according to claim 1, wherein the heat exchanger is designed as a reflector.

16. The reaction device according to claim 1, wherein the heat exchanger has fins.

17. The reaction device according to claim 1, wherein the reaction device is configured to carbonize, crack, and reform biomass and/or bioresidues.

18. The reaction device according to claim 1, wherein the reaction device is configured to remove heat from exothermic processes and to recover heat.

19. The reaction device according to claim 1, wherein the reaction device is configured to dynamically control temperature-controlled rector systems in which heat is first supplied to a process taking place in the reactor and the heat is dissipated after exceeding a predetermined threshold.

* * * * *